US012700270B2

(12) United States Patent
Karlsson et al.

(10) Patent No.: US 12,700,270 B2
(45) Date of Patent: Aug. 4, 2026

(54) COMPUTER SYSTEM AND METHOD FOR HANDLING TENSION OF AT LEAST ONE STRAP ARRANGED FOR STRAPPING CARGO IN A VEHICLE

(71) Applicant: VOLVO TRUCK CORPORATION, Gothenburg (SE)

(72) Inventors: Johanna Karlsson, Torslanda (SE); Ingmar Bengtsson, Lindome (SE); Thorsten Helfrich, Gothenburg (SE); Joshua Shire, Gothenburg (SE); Leo Laine, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 98 days.

(21) Appl. No.: 18/678,459

(22) Filed: May 30, 2024

(65) Prior Publication Data

US 2024/0404330 A1 Dec. 5, 2024

(30) Foreign Application Priority Data

Jun. 1, 2023 (EP) .................................... 23176849

(51) Int. Cl.
*G07C 5/08* (2006.01)

(52) U.S. Cl.
CPC .................................. *G07C 5/0808* (2013.01)

(58) Field of Classification Search
CPC ............................ G07C 5/0808; B60P 7/0861
See application file for complete search history.

(56) References Cited

U.S. PATENT DOCUMENTS 10,328,842 B2 6/2019 McNally
2022/0242302 A1 * 8/2022 Goetz .................. B60P 7/0869

FOREIGN PATENT DOCUMENTS

WO 2022020442 A1 1/2022

OTHER PUBLICATIONS

International Road Transport Union, International Guidelines on Safe Load Securing for Road Transport, 2014, Health and Safety Authority, Edition: IRU_CIT-2014 version 01 (Year: 2014).*
Extended European Search Report in corresponding European Application No. 23176849.0 dated Dec. 4, 2023 (8 pages).

* cited by examiner

*Primary Examiner* — Michael V Kerrigan
(74) *Attorney, Agent, or Firm* — Jeffri A. Kaminski; Venable LLP

(57) ABSTRACT

A computer system handles tension of at least one strap arranged for strapping cargo in a vehicle. The computer system includes processing circuitry configured to obtain cargo information; obtain vehicle information; determine, based on the cargo information and the vehicle information, a pack plan, wherein the pack plan comprises a planned tension; determine to start loading the cargo in the vehicle and using the planned tension; obtain information about a first current tension of the at least one strap when the loading is finished and before the vehicle drives; compare the planned tension and the first current tension; and to determine to initiate a first action when a result of the comparison indicates that the first current tension is different than the planned tension.

14 Claims, 4 Drawing Sheets

COMPUTER SYSTEM AND METHOD FOR HANDLING TENSION OF AT LEAST ONE STRAP ARRANGED FOR STRAPPING CARGO IN A VEHICLE

TECHNICAL FIELD

The disclosure relates generally to a computer system, a vehicle, a computer-implemented method, a computer program product and a non-transitory computer-readable storage medium. In particular aspects, the disclosure relates to handling tension of at least one strap arranged for strapping cargo in a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Today, accidents occur as a result of improper and insufficient loading of cargo in a vehicle. It is important that cargo in the vehicle is loaded in a manner that takes safety into account. For example, it may be a safety risk associated with cargo moving inside the vehicle during transportation and during unloading if the cargo is not loaded properly. There may also be a risk of the whole vehicle tipping over.

Straps are commonly used for strapping the cargo after it has been loaded in the vehicle. Straps may be used for fixing and holding down the cargo in its position during transportation in the vehicle, i.e. to fasten the cargo to the vehicle. However, the tension of the strap may change during the transportation which may cause movement of the cargo inside the vehicle.

When a vehicle is operated without a driver, i.e. an at least partly autonomous vehicle, it is important that the cargo is properly strapped and distributed inside the vehicle. The driver's know-how of packing a vehicle and how it behaves in traffic may be lost due to the fact that there is no driver of this type of vehicle.

Furthermore, there are also reduced operating hours at loading stations for preparing the cargo for transport, which may lead to a short amount of time may be allocated for the loading and unloading of the cargo. Proper loading of the cargo may therefore not be prioritized when trying to finish the loading and/or unloading without exceeding the allocated amount of time.

Therefore, there is a need to at least mitigate or solve this issue.

SUMMARY

According to a first aspect of the disclosure, a computer system for handling tension of at least one strap arranged for strapping cargo in a vehicle is provided. The computer system comprises processing circuitry configured to:

obtain cargo information about the cargo to be loaded in the vehicle;

obtain vehicle information indicating a loading capability of the vehicle;

determine, based on the cargo information and the vehicle information, a pack plan for how to pack the cargo in the vehicle, wherein the pack plan comprises a planned tension of the at least one strap when strapping the cargo in the vehicle;

determine to start loading the cargo in the vehicle and using the planned tension;

obtain information about a first current tension of the at least one strap when the loading is finished and before the vehicle drives;

compare the planned tension and the first current tension; and to determine to initiate a first action when a result of the comparison indicates that the first current tension is different than the planned tension.

The first aspect of the disclosure may seek to provide improved handling of tension of at least one strap arranged for strapping cargo to in the vehicle. A technical benefit may include that when the first current tension is not the same as the planned tension, the first current tension may be adjusted such that it becomes the same as the planned tension, which may reduce the risk for cargo shifting when the vehicle is driving, it may reduce the risk for accidents during unloading, it may reduce the risk for damages on the cargo etc.

In some examples, including in at least one preferred example, optionally the processing circuitry may be further configured to:

obtain information about a second current tension of the at least one strap during driving and before unloading the cargo from the vehicle;

compare the planned tension and the second current tension; and to during driving and before unloading the cargo, determine to initiate a second action when the second current tension is different than the planned tension.

The information about the second current tension may be obtained continuously during driving, i.e. obtained multiple times, or it may be obtained once. A technical benefit may include that if the tension of the at least one strap has changed during driving, the second current tension may be adjusted such that it becomes the same as the planned tension. This may reduce the risk for cargo shifting when the vehicle is driving, it may reduce the risk for accidents during unloading, it may reduce the risk for damage to the cargo etc. If the difference between the second current tension and the planned tension is above a threshold, the vehicle may be stopped in order to reduce the risk for damage, to increase safety etc. If the tension of the at least one strap has changed, the cargo has probably already shifted, e.g. changed position in the vehicle. In addition to changing the tension again, some repacking of the cargo may also be needed.

In some examples, including in at least one preferred example, optionally the processing circuitry may be further configured to:

utilize information from the comparison between the planned tension and the first current tension to improve future determining of the planned tension.

A technical benefit may include that future determining of the planned tension is improved since it may learn from previous and historic decisions of the planned tension. Tensions that may have led to damage and/or increased safety risks may be avoided in future decision of the planned tension. Furthermore, the future decision of the planned tension may be performed faster since it is based on the previous and historic tension decisions.

In some examples, including in at least one preferred example, optionally the processing circuitry may be further configured to:

utilize information from the comparison between the planned tension and the second current tension to improve future determining of the planned tension.

A technical benefit may include that future determining of the planned tension is improved since it may learn from previous and historic decisions of the planned tension.

Tensions that may have led to damage and/or increased safety risks may be avoided in future decision of the planned tension. Furthermore, the future decision of the planned tension may be performed faster since it is based on the previous and historic tension decisions.

In some examples, including in at least one preferred example, optionally the information about the first current tension may be obtained from a tension sensor comprised in or associated with the at least one strap.

A technical benefit may include that the tension sensor may be an accurate sensor arranged to provide information about the first current tension with accuracy above an accuracy threshold, e.g. high accuracy. A tension sensor may provide information about the first current tension with higher accuracy and with a shorter time delay compared to manually determining the first current tension.

In some examples, including in at least one preferred example, optionally the information about the second current tension may be obtained from a tension sensor comprised in or associated with the at least one strap.

A technical benefit may include that the tension sensor may be an accurate sensor arranged to provide information about the second current tension with accuracy above an accuracy threshold, e.g. high accuracy. A tension sensor may provide information about the second current tension with higher accuracy and with a shorter time delay compared to manually determining the first current tension.

In some examples, including in at least one preferred example, optionally the first action may comprise one or more of:

- to change the first current tension of the at least one strap such that it is substantially the same as the planned tension; and/or
- to repack the cargo.

A technical benefit may include that the vehicle may not start to drive before the cargo is strapped with the planned tension. When the cargo is repacked, e.g. reorganized in the vehicle, it may be repacked with respect to weight, size, content, unloading plan etc. This may improve efficiency in unloading the cargo from the vehicle, it may increase safety during transportation etc.

In some examples, including in at least one preferred example, optionally the second action may comprise to stop the vehicle. When the vehicle has stopped, the cargo may be repacked and/or the second current tension may be adjusted such that it is the same as the planned tension, e.g. the at least one strap may be tightened. A technical benefit may include that it reduces the risk of damaged cargo, it increases safety, etc.

In some examples, including in at least one preferred example, optionally the pack plan may comprise information about one or more of the following:

- a position of the cargo in the vehicle, wherein the position is based on one or more of: a cargo weight and/or an unloading order of the cargo and/or a fill ratio of the vehicle; and/or
- a number of available straps; and/or
- strap capability.

A technical benefit may include that the cargo may be packed in the vehicle as optimal as possible. For example, the pack plan may comprise information about a specified cargo weight or a predetermined cargo weight, and this may be compared with the actual cargo weight to ensure that the information in the pack plan is correct. Another technical benefit may include that it may reduce the risk for damaged cargo, it increases safety during transportation, it reduces the risk for shifting of the load during transportation etc.

According to a second aspect of the disclosure, a vehicle comprising the computer system of the first aspect is provided.

According to a third aspect of the disclosure, a computer-implemented method for handling tension of at least one strap arranged for strapping cargo in a vehicle is provided. The method comprises:

- obtaining, by processing circuitry of a computer system, cargo information about the cargo to be loaded in the vehicle;
- obtaining, by the processing circuitry, vehicle information indicating a loading capability of the vehicle;
- determining, by the processing circuitry, based on the cargo information and the vehicle information, a pack plan for how to pack the cargo in the vehicle, wherein the pack plan comprises a planned tension of the at least one strap when strapping the cargo in the vehicle;
- determining, by the processing circuitry, to start loading the cargo in the vehicle using the planned tension;
- obtaining, by the processing circuitry, information about a first current tension of the at least one strap when the loading is finished and before the vehicle drives;
- comparing, by the processing circuitry, the planned tension and the first current tension; and
- determining, by the processing circuitry, to initiate a first action when a result of the comparison indicates that the first current tension is different than the planned tension.

In some examples, including in at least one preferred example, optionally, the method may comprise:

- obtaining, by the processing circuitry, information about a second current tension of the at least one strap during driving and before unloading the cargo from the vehicle;
- comparing, by the processing circuitry, the planned tension and the second current tension; and
- during driving and before unloading the cargo, determining, by the processing circuitry to initiate a second action when the second current tension is different, than the planned tension.

In some examples, including in at least one preferred example, optionally, the method may comprise:

- utilize, by the processing circuitry, information from the comparison between the planned tension and the first current tension to improve future determining of the planned tension.

In some examples, including in at least one preferred example, optionally, the method may comprise:

- utilize, by the processing circuitry, information from the comparison between the planned tension and the second current tension to improve future determining of the planned tension.

In some examples, including in at least one preferred example, optionally, information about the first current tension may be obtained from a tension sensor comprised in or associated with the at least one strap.

In some examples, including in at least one preferred example, optionally, the information about the second current tension may be obtained from a tension sensor comprised in or associated with the at least one strap.

In some examples, including in at least one preferred example, optionally, the first action may comprise one or more of:

- to change the first current tension of the at least one strap such that it is substantially the same as the planned tension; and/or
- to repack the cargo.

In some examples, including in at least one preferred example, optionally, the second action may comprise to stop the vehicle.

According to a fourth aspect of the disclosure, a computer program product is provided. The computer program product comprises program code for performing, when executed by a processing circuitry, the method of the second aspect.

According to a fifth aspect of the disclosure, a non-transitory computer-readable storage medium is provided. The non-transitory computer-readable storage medium comprises instructions, which when executed by a processing circuitry, cause the processing circuitry to perform the method of the second aspect.

The second aspect and/or third aspect and/or fourth aspect, and/or fifth aspect may seek to provide improved handling tension of at least one strap arranged for strapping cargo in the vehicle. A technical benefit is the same and/or corresponds to the technical benefits of the first aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The disclosure may solve the potential problem of handling tension of at least one strap arranged for strapping cargo in a vehicle. The technical effect that may occur is that the handling of tension of at least one strap arranged for strapping cargo in a vehicle is improved.

Figure 1:
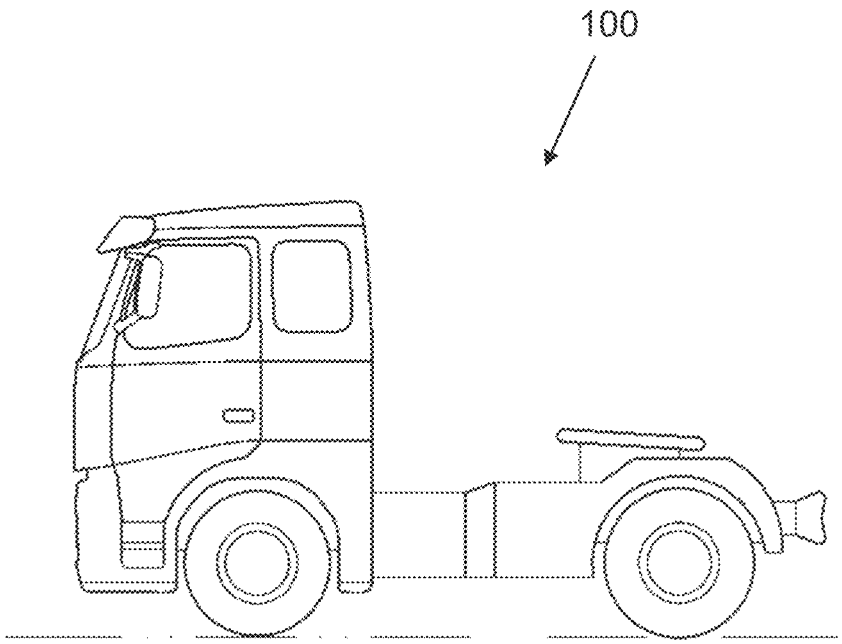
FIG. 1 is an exemplary drawing of a vehicle, according to an example.

FIG. 1 is an exemplary drawing of a vehicle 100, according to an example. The vehicle 100 comprises a loading space or cargo space. The vehicle 100 may be a heavy-duty vehicle, such as truck, bus, trailer, wheel loader, articulateauler, excavator, backhoe loader, passenger car, marine vessel, among other vehicle types that comprise a loading space or cargo space. The vehicle 100 may be a vehicle combination or the vehicle may be comprised in a vehicle combination. The vehicle combination comprises a truck and at least one trailer, where at least one of the truck and the trailer has loading capabilities or is arranged to hold cargo. The vehicle 100 may be an industrial construction machine or working machine. The vehicle 100 may be a fully electrically operated vehicles, a partly electrically operated vehicle, i.e. a hybrid vehicle which is operated both by an electrical machine and a combustion engine, and it may be a vehicle only operated by a combustion engine, i.e. not having any electrical engine. The term vehicle will be used herein when referring to any of the above types of vehicles.

The vehicle 100 may be a completely autonomous vehicle, it may be a partly autonomous vehicle, or it may be a manually operated vehicle. Although the disclosure may be described with respect to a particular vehicle, the disclosure is not restricted to any particular vehicle.

The vehicle 100 is arranged to be loaded with cargo, i.e. the vehicle 100 is arranged to carry cargo. The cargo may be loaded in a closed or open compartment of the vehicle 100. The vehicle 100 may be a cargo vehicle. The cargo may be referred to as freight, goods, load etc. The cargo loaded in the vehicle 100 may be of the same or different size, the same or different weight, the same or different shape, the same or different type etc. There may be one or multiple numbers of cargo in the vehicle 100.

At least one strap is arranged to be tensioned and to strap the cargo when it has been loaded into the vehicle 100. There may be one strap for each piece of cargo, or there may be multiple straps for each piece of cargo, or there may be one strap for multiple pieces of cargo, or there may be multiple straps for multiple pieces of cargo. Multiple pieces of cargo may be bundled and strapped with one or multiple straps. The term at least one strap may be described as n number of straps, where n is a positive integer. The term strap may be used herein for the sake of simplicity when referring to at least one strap.

A strap may be referred to as a lash, a buckle, a belt etc. The strap may be of any suitable type which is arranged to strap cargo in and/or to the vehicle 100, for example a tie-down strap. The strap is arranged to be placed around the cargo and fastened to the vehicle 100, for example to an anchor point at a suitable position in the vehicle 100. The strap may comprise one or more of: a band, a tension device, a gripping device. The band may be referred to as strap, webbing, belt etc. The band may have any suitable length and width, and it may be made of any suitable material. The band may be one band, or it may comprise two or more sub-bands which may be connected via, for example a tension device, by tying them together with a knot or by any other suitable connector.

The tension device may be a buckle, a ratchet etc. The tension device is arranged to tension the strap such that the cargo is secured to the vehicle 100. The tension device may be located at any suitable location on the band, for example in an end which is opposite of the end where the gripping device is connected.

The strap may comprise a gripping device in one or both ends of the band. The gripping device may be a hook which is arranged to be attached to an anchor point in the vehicle 100, e.g. a ring, a hook etc. at the floor or any other suitable place of the vehicle 100.

The strap is arranged to support a maximum cargo weight. The strap has a working load and a break strength.

Figure 3:
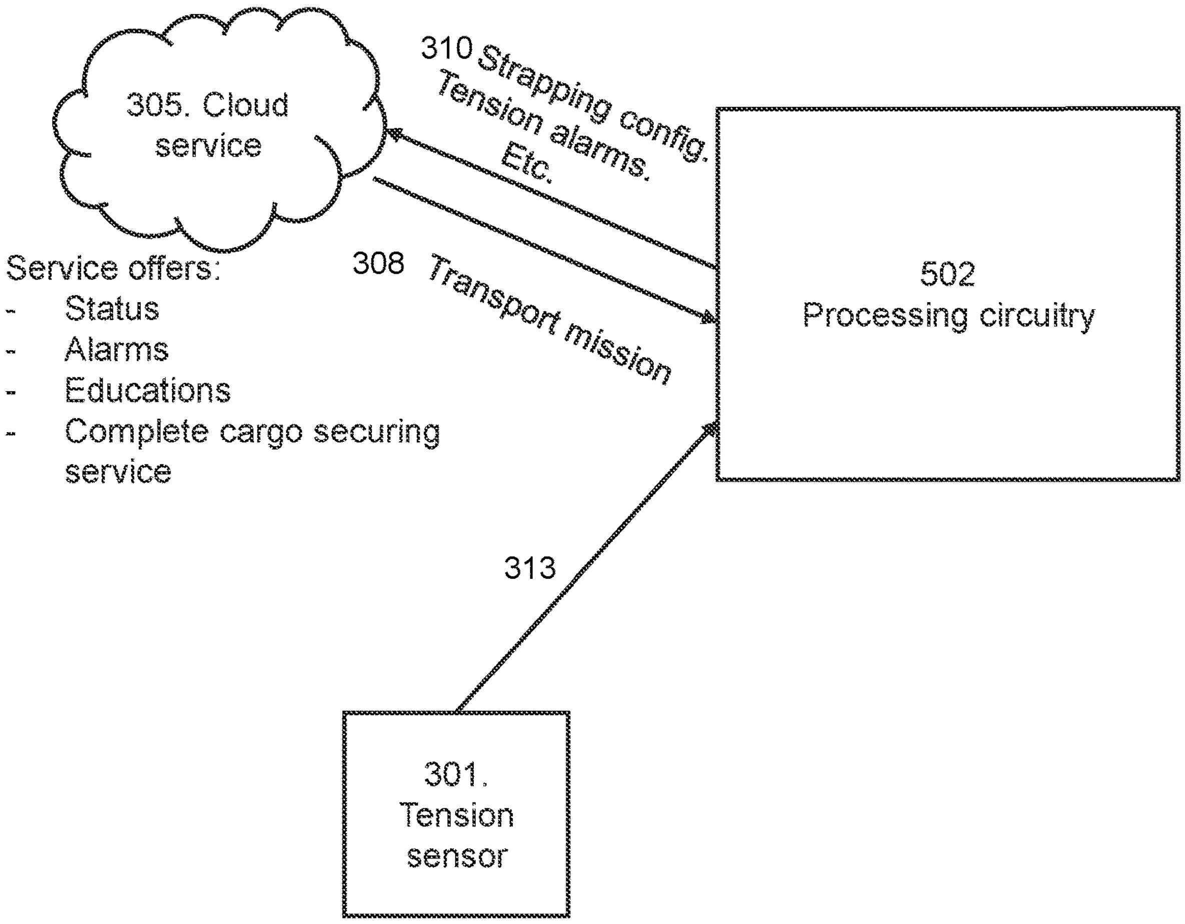
FIG. 3 is an exemplary schematic drawing of cargo strapping.
Figure 5:
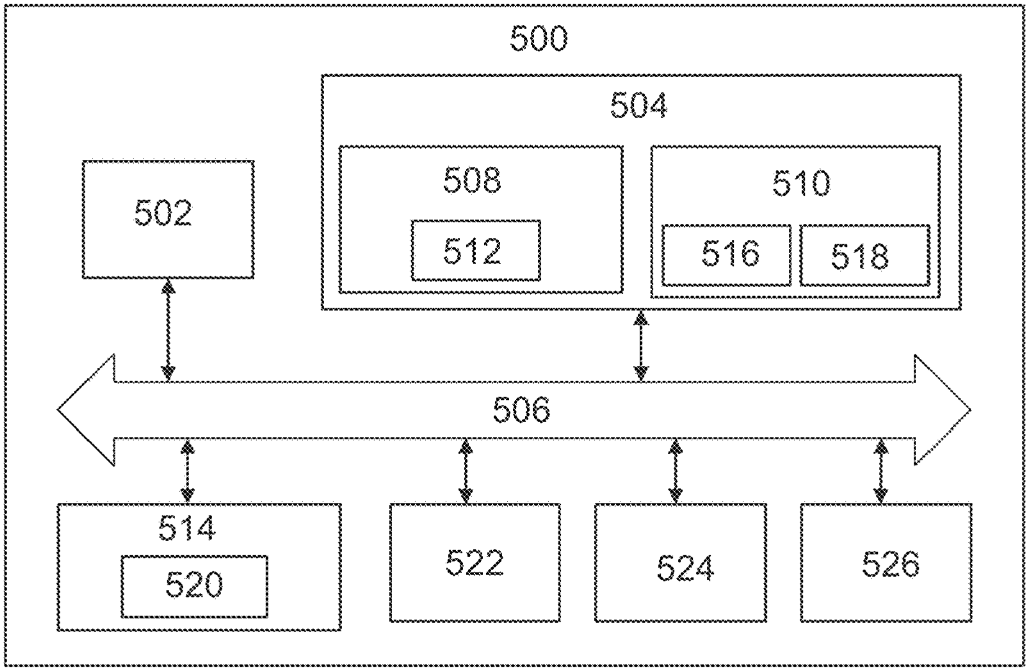
FIG. 5 is a schematic diagram of an exemplary computer system for implementing examples disclosed herein, according to an example.

The strap may comprise one or more tension sensors 301, or one or more tension sensors 301 may be associated with the strap for example by being connected to the strap in a suitable fashion, e.g. wirelessly, via wire etc. The reference number 301 is illustrated in FIG. 3 and will be described in more detail later. The tension sensor 301 may be a built-in sensor, i.e. built into the strap, or it may be a separate device attached to the strap. The tension sensor 301 may be comprised in the tension device of the strap. The tension sensor 301 is arranged to sense and measure the tension of the strap which indicates how tight the cargo is strapped to the vehicle 100. The tension sensor 301 is arranged to provide tension information to a processing circuitry 502. The reference number 502 is illustrated in FIG. 5 and will be described in more detail later. The tension information may be provided to the processing circuitry 502 via a wired communication link or a wireless communication link. The processing circuitry 502 may be comprised in, for example, the user equipment mentioned earlier, e.g. a portable electronic device such as a mobile phone, tablet computer etc. With the tension information, the user may monitor the tension of the strap without having to physically examine the strap. The tension sensor 301 may be powered by any suitable powering device, e.g. a battery. The battery may be a rechargeable battery, it may be powered by a solar panel, it may be powered by connecting it to the power grid etc.

The present disclosure provides a digital twin of the vehicle's cargo hold and its cargo. The digital twin may be created based on order information, e.g. package size, weight etc., together with vehicle capabilities, e.g. axle load capacity, cargo load and type capability, volume etc. The digital twin is updated at any point of time in the current cargo situation. During driving, the tensions and axle load etc. may be checked to secure the cargo all the time.

The digital twin may be described as a digital representation or a digital model of the vehicle's cargo and how it is loaded in and out of the vehicle 100. The term virtual representation, digital representation and virtual model may also be used for the digital twin. The digital twin mirrors the reality, i.e. the real loading of cargo in the vehicle 100.

The digital twin is arranged to obtain real-time and real-world operational data of the cargo, its strapping and loading in and unloading of the vehicle 100, e.g. real-time operational data, such that when a change occurs to the cargo in the real world, then the digital twin is up to date with these changes. The digital twin, the vehicle 100 and the tension sensor 301 are therefore arranged to be connected to each other, via a wired communication link or a wired communication link or a partly wired and partly wireless communication link. The digital twin is arranged to dynamically change in accordance with real-world changes of the vehicle 100, the cargo, the tension etc. This is different from general computer simulations which are not based on real-time data. Based on the operational data of the vehicle 100, the cargo, the tension etc., the digital twin may be arranged to model or predict the strapping of the cargo in the vehicle 100, for example to model expected tensioning for a given scenario. The digital twin simulates what is actually happening to an actual vehicle 100 and its cargo in the real world, which is different to a simulation which simulates what could happen to a vehicle 100. The digital twin may be configured to display the result of its modelling, for example on a display of a tablet computer, a mobile phone, a stationary computer, a vehicle display etc.

The digital twin may be implemented on and run on a processing circuitry 502. The processing circuitry 502 may comprise for example a processor, a memory storage, a communication interface etc. The processing circuitry 502 may comprise hardware and software. The processing circuitry 502 is arranged to enable data transfer between the vehicle 100, the tension sensor 301 and the digital twin. The processing circuitry 502 may be arranged to store data from the vehicle 100, the tension sensor 301 and the digital twin, e.g. in a local memory unit comprised in the processing circuitry 502, in a central memory unit, in a cloud memory unit etc.

The processing circuitry 502 and the vehicle 100 may be located at the same location or in different locations. The processing circuitry 502 and the vehicle 100 may be located at the same location or in different locations. A first part of the processing circuitry 502 may be comprised in the vehicle 100 and a second part of the processing circuitry 502 may be comprised in another unit remotely located from the vehicle 100, i.e. the processing circuitry 502 may be a distributed computer unit. The processing circuitry 502 may be a remote server or comprised in a remote server which is remotely located with respect to the vehicle 100. The processing circuitry 502 may be partly or completely comprised in the vehicle 100.

The digital twin may be comprised in the vehicle 100 or, in a processing circuitry 502 or in a cloud solution. The digital twin may be a software in a fixed location or it may be a set of distributed software packages that are interaction to the overall analysis performance, fix location or moving based on usage and other performance factors. The digital twin may be completely comprised in the vehicle 100 or it may be completely comprised in another unit, e.g. a processing circuitry 502 remotely located from the vehicle 100. The digital twin may be distributed such that a first part of the digital twin is located at a first location, e.g. comprised in the vehicle 100, and a second part of the digital twin is located at a second location, e.g. comprised in a remote processing circuitry 502.

The digital twin may be described in the terms of a process, i.e. the digital twin, e.g implemented on the processing circuitry 502, may be arranged to perform or comprises at least one of the steps in the following method:

1. Obtain information about the cargo, i.e. cargo information. The cargo information may comprise shapes, weight, size, picture of the cargo, stack possibility, fragile, id etc.
2. Pre-determine how the cargo should be packed and strapped, i.e. including tension of the strap, in the vehicle 100, and in a priority order:
   a. Heavy cargo in the front of the vehicle 100 for collision and/or braking safety, where heavy cargo may be the ones that have a weight above x*10 kg, where x is a positive integer.
   b. The cargo to be first unloaded from the vehicle 100 should be located closest to the unloading opening of the vehicle 100, where the opening may be at the back, a side etc. of the vehicle 100.
   c. Packaging optimization on fill ratio
      i. Use height of the vehicle's cargo compartment and not only floor space, by knowing stack possibility.
      ii. Pack cargo with the largest sizes in the bottom
      iii. Place fragile cargo securely, e.g. in the highest location of the cargo compartment or in a corner or lowest location of the cargo compartment.
   d. Determine where to put the strap, and minimize a number of straps i. Information about the available strap and its specification and performance, e.g. how much pressure the strap can handle.
ii. Lump cargo together.
iii. Use strap specification for determining tension capability.
e. An alternative to a strap may be to use a net. The term strap used herein may comprise a net.
3. Use an augmented reality tool to pack the vehicle 100, comprising an image of the cargo and how to strap it
a. A manual strap may be used, i.e. a strap that is arranged to be manually tightened.
b. An automatic strap may be used, i.e. a strap that is automatically tightened for example triggered by the processing circuitry 502.
4. Check after loading that the vehicle 100 is packed according to the plan, i.e. perform a tension check.
a. If there is a difference compared to the plan that is above a difference threshold, i.e. if there is a big difference, then the cargo may be repacked
b. If the difference compared to the plan is below the difference threshold or if there is no difference, then the current packing of the cargo may be stored.
5. Store all the information in the digital twin, e.g. in a memory accessible by the digital twin. The information that is stored may comprise for example cargo information, package information, strap information, strap tension information, such as calculated and measured tension, current cargo weight etc. i.e. a copy of the cargo hole as well as the actual tension
6. Continuously check the tension in the strap during driving and before unpacking:
a. If there is a difference between the current tension and the start tension or if the difference is above the difference threshold, i.e. if there is a big difference, then the vehicle 100 may be stopped. If the tension of the strap has changed, the cargo has probably already shifted, e.g. changed position in the vehicle. In addition to changing the tension again, some repacking of the cargo may also be needed.
7. Store all the information in the digital twin, e.g. in a memory accessible by the digital twin. The stored information may be information indicating if the tension sensor measurements have changed, i.e. tension information update.
8. Improve step 2) based on the information stored in step 5) and step 7), e.g. iterate step 2) based on the information from step 7).

Figure 2A:
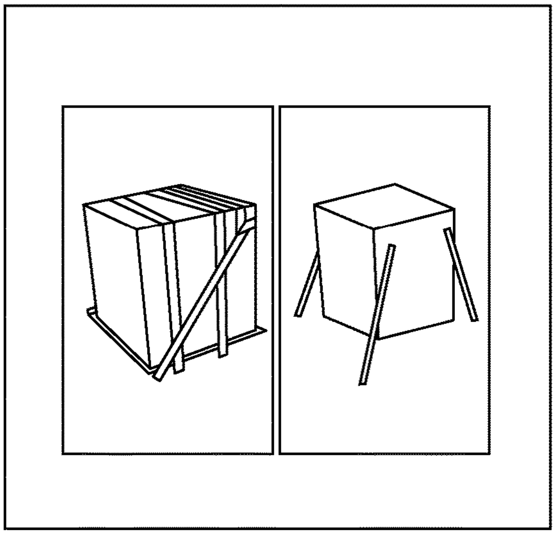
FIG. 2*a* is an exemplary schematic drawing of cargo strapping.

A user, e.g. the driver of the vehicle 100, a loading operator etc. may have access to a computer application that provides information about the loading and/or unloading of cargo from the vehicle 100. The computer application may be accessible via a user equipment such as for example a mobile phone, a tablet computer, a stationary computer etc. The computer application may provide an interface towards the user with information about the loading and/or unloading of cargo. FIG. 2*a* is an exemplary schematic drawing of information provided by the computer application. The two boxes in FIG. 2*a* represent alternatives for how the cargo may be strapped. The cargo is represented by a carton. The left box illustrates that the cargo may be strapped using three straps where all are placed over the lid of the carton, and the right box illustrates that the cargo may be strapped using two straps located under the lid of the carton.

Figure 2B:
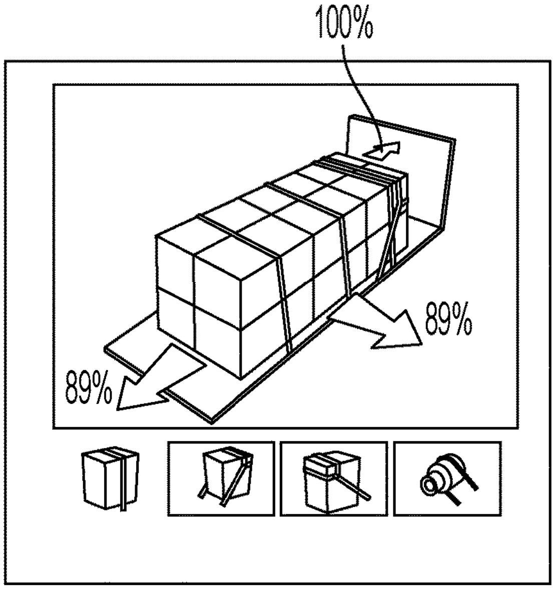
FIG. 2*b* is an exemplary schematic drawing of cargo strapping.

FIG. 2*b* is an exemplary schematic drawing of information provided by the computer application. The top part of FIG. 2*b* illustrates how much of the loading capacity that the cargo takes up. For example, the cargo takes up 89% of the loading capacity in two of the directions, and 100% of the loading capacity in one of the directions. This indicates that there is available loading capacity in at least two of the directions. The middle four boxes of FIG. 2*b* illustrate alternatives for strapping the cargo, i.e. how to arrange one or more straps to the cargo such that the cargo is sufficiently strapped such that the vehicle 100 is ready to start driving. As illustrated in FIG. 2, the strap may have one or two anchoring points to the vehicle 100, and the strap may be guided in different ways over and/or around the cargo, e.g. diagonally as exemplified in the two middle boxes, around the cargo as in the right most box, over the top of the cargo as in the left most box etc.

Figure 2C:
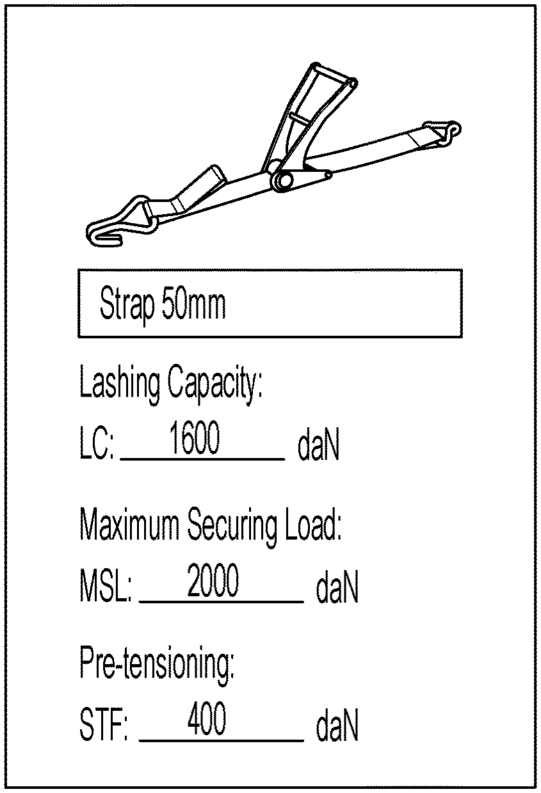
FIG. 2*c* is an exemplary schematic drawing of cargo strapping.

FIG. 2*c* is an exemplary schematic drawing of information provided by the computer application. The information in FIG. 2*c* relates to the properties of the strap. The example in FIG. 2*c* illustrates that the strap comprises hooks for fastening to the vehicle 100 and a tension device in the form of a buckle. The exemplified strap in FIG. 2*c* has a lashing capacity (LC) of 1600 daN, a maximum securing load (MSL) of 2000 daN and a pre-tensioning, also referred to as Standard Tension Force (STF), of 400 daN. daN is short for Dekanewton.

FIG. 2*a*, FIG. 2*b* and FIG. 2*c* may be screen shots of the computer application that may be provided to the user equipment.

FIG. 3 is another exemplary schematic drawing of cargo strapping. FIG. 3 illustrates the tension sensor 301. The tension sensor 301 is arranged to provide tension information 303 to the processing circuitry 502, e.g. information about the current tension of the strap. The processing circuitry 502 may be associated with a Human Machine Interface (HMI) 303 arranged to interface with the user, e.g. the driver of the vehicle 100, a loading operator or any other suitable user. The HMI may be comprised in a vehicle display and/or the user equipment, e.g. a mobile HMI. The processing circuitry 502 may be provided with vehicle information. The vehicle information may comprise for example one or more of the following:

Axel configuration, and/or
Axel loads, and/or
Frictions, and/or
Load/weight data, e.g. predetermined cargo weight, and/or
Trailer information FIG. 3 illustrates a tension sensor 301, a cloud service 305 and the processing circuitry 502. The processing circuitry 502 may comprise an HMI such as e.g. a vehicle display and/or a mobile HMI. The cloud service 305 may be arranged to provide service offers to the processing circuitry 502 such as for example:

Status
Alarms
Educations
Complete cargo securing service.

The cloud service 305 is arranged to provide information indicating a transport mission 308 of the vehicle 100 to the processing circuitry 502. The transport mission 308 may comprise a suggested strap configuration of the tension device 301, and the suggested strap configuration may be determined using an AI and/or ML algorithm. The processing circuitry 502 may provide information 310 about the strap configuration, tension alarms etc. to the cloud service 305. The strap configuration in the transport mission 308 is a calculated strap configuration, while the strap configuration in the information 310 is a measured strap configuration. A tension alarm may be triggered if for example the tension is suddenly dropping, i.e. the tension drops below a threshold during a time period. If the tension drops below a threshold during a time period, it may be an indication of that the strap is loose. The processing circuitry 502 may be preconfigured with vehicle information such as for example axel configuration of the vehicle 100, axel loads, frictions, load data, weight data, trailer information etc. The tension sensor 301 may provide information 313 about the current tension of the strap to the processing circuitry 502. Another example of a service offer may be to provide information or alarms to a vehicle fleet owner indicating that the tension has changed. Another example of a service offer may be that based on the monitoring of the tension and if the tension is changed often when a certain operator loads the vehicle 100, then a service offer may be to determine that the person performing the loading of the vehicle 100 should be trained in using the strap because the monitored tension indicates that the strap is not correctly handled.

There may be at least one image capturing device arranged to capture images of the cargo before it is loaded into the vehicle 100, during loading and after the loading has been completed. The images may be provided from the image capturing device to the processing circuitry 502 such that the processing circuitry 502 may identify the cargo, its shape etc. and consequently determines how the cargo should be strapped, possibly together with information from the tension sensor 301. The at least one image capturing device may be comprised in the vehicle 100 it may be located at the loading facility, e.g. a warehouse, it may be comprised in an operator's mobile phone etc.

Figure 4:
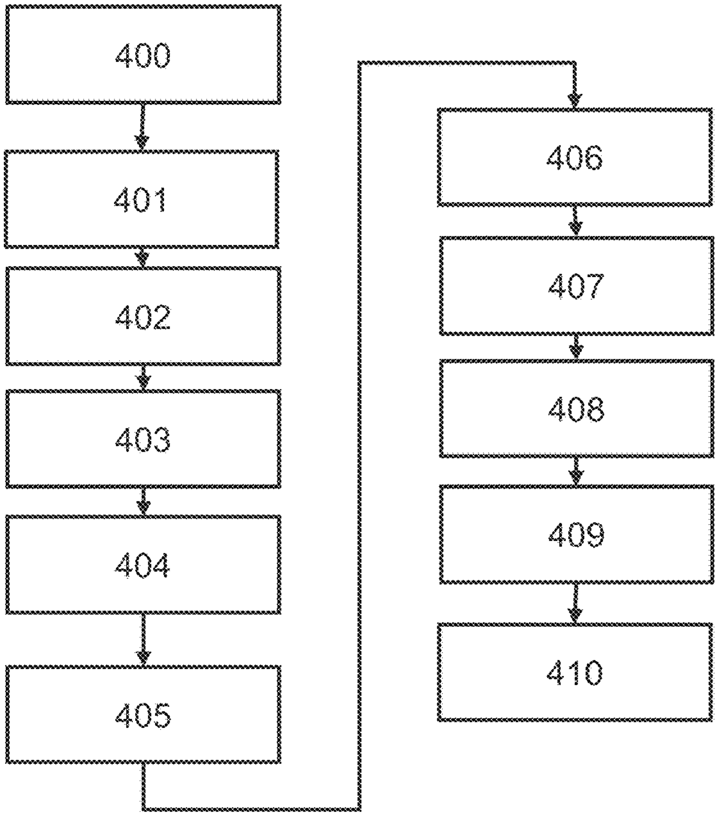
FIG. 4 is an exemplary flow chart illustrating a method.

FIG. 4 is a flow chart of a method for handling tension of at last one strap arranged for strapping cargo in a vehicle 100 according to an example. The method comprises at least one of the following steps, which steps may be performed in any suitable order than described below:

Step 400: This step corresponds to step 1 described earlier. The processing circuitry 502 of a computer system 500 obtains cargo information about the cargo to be loaded in the vehicle 100. Reference number 500 is illustrated in FIG. 5 and will be described later in more detail. The cargo information may comprise information about for example one or more of: shape of the cargo, predetermined cargo weight, cargo size, picture of the cargo, the cargo's stack possibility, information indicating if the cargo and it's content is fragile, cargo ID etc. The cargo information may be obtained from another processing circuitry, from a memory storage, from a User Equipment (UE) such as for example a mobile phone, a tablet computer etc.

Step 401: The processing circuitry 502 obtains vehicle information indicating the loading capability of the vehicle 100. The vehicle information may comprise for example Axel configuration, and/or Axel loads, and/or Frictions, and/or Load/weight data, and/or Trailer information, and/or Load volume capacity; and/or Size and measurements of the cargo hold.

The vehicle information may be obtained from another processing circuitry, from a memory storage, from a UE such as for example a mobile phone, a tablet computer etc.

Step 402: This step corresponds to step 2 described earlier. The processing circuitry 502 determines, based on the cargo information and the vehicle information, a pack plan for how to pack the cargo in the vehicle 100. The pack plan comprises information indicating packing of the cargo in the vehicle 100. The pack plan comprises a planned tension of the at least one strap when strapping the cargo in the vehicle 100. The planned tension may be a first tension or a predetermined tension. The pack plan may comprise information on how the cargo should be packed, a priority order of the cargo, etc. The pack plan may comprise information about one or more of the following:

- a position of the cargo in the vehicle 100, wherein the position is based on one or more of: a cargo weight and/or an unloading order of the cargo and/or a fill ratio of the vehicle 100; and/or
- a number of available straps, e.g. straps that are available to be used for strapping the cargo in the vehicle 100; and/or
- strap capability.

Step 403: The processing circuitry 502 determines to start loading the cargo in the vehicle 100 using the planned tension. The decision to start loading the cargo may comprise to trigger a loading device to start loading the cargo, e.g. a loading robot, an autonomous loading truck etc., it may comprise to send instructions to a UE arranged to be used by a driver of the vehicle 100, the loading personnel, the warehouse personnel etc. where the instructions indicates that he/she should start loading.

Step 404: This step corresponds to step 4 described earlier. The processing circuitry 502 obtains information about a first current tension of the strap when the loading is finished and before the vehicle 100 drives, i.e. before it drives from the loading location. Consequently, the processing circuitry 502 is arranged to determine that the loading is finished, for example via received user input indicating that the loading is finished, by receiving information indicating that the loading is finished from another processing circuitry, from a loading truck, or from any other suitable unit. The information about the first current tension may be obtained from a tension sensor 301 comprised in or associated with the strap. The first current tension may be a second tension or an after loading tension.

Step 404 may comprise to obtain information about a current cargo weight of the cargo currently loaded in the vehicle 100. The current cargo weight may be measured by and obtained from a weighing device comprised in the vehicle 100 or associated with the vehicle 100, e.g. a weighing device on which the vehicle 100 is located or drives past, and the weighing device may provide the information about the current cargo weight to the processing circuitry 502.

Step 405: This step corresponds to step 4 described earlier. The processing circuitry 502 compares the planned tension and the first current tension. The planned tension may be the same as the first current tension or they may be different.

Step 405 may comprise that the processing circuitry 502 compares the current cargo weight with a predetermined cargo weight. The predetermined cargo weight indicates the weight of the cargo before it has been loaded in the vehicle 100. The predetermined cargo weight may be comprised in the cargo information. By comparing the current cargo weight and the predetermined cargo weight, it may be possible to ensure whether or not the input data is correct. If a result of the comparison indicates that the current cargo weight and the predetermined cargo weight are different, or that the difference between them are above a cargo weight threshold, then the processing circuitry 502 may determine that it may be indication of that the predetermined cargo weight is not correct. Detecting the difference may trigger an action to be taken by the processing circuitry 502, to send information about the difference to a UE to be further handled by a user of the UE etc.

Step 406: This step corresponds to step 4 described earlier. The processing circuitry 502 determines to initiate a first action when a result of the comparison indicates that the first current tension is different than the planned tension, or that the difference is above a tension difference threshold. The first action may comprise one or more of:

to change the first current tension of the strap such that it is substantially the same as the planned tension; and/or to repack the cargo.

The decision to initiate the first action may comprise to trigger the strap to automatically change its tension, to send information about the different tension to e.g. a UE arranged to be used by the driver of the vehicle 100, the loading personnel, the warehouse personnel etc. which consequently may manually change the tension of the strap. The decision to initiate the first action may comprise to trigger the repacking of the cargo, to send information about the repacking to e.g. a UE arranged to be used by the driver of the vehicle 100, the loading personnel, the warehouse personnel etc. which consequently manually changes the tension of the strap, to send information about the repacking to the loading robot, an autonomous loading truck etc. Repacking may for example comprise to reorganize the cargo in the vehicle 100, to change the order of the cargo in the vehicle 100 etc.

Step 407: This step corresponds to step 6 described earlier. The processing circuitry 502 may obtain information about a second current tension of the strap during driving and before unloading the cargo from the vehicle 100. The information about the second current tension may be obtained from a tension sensor 301 comprised in or associated with the strap. The second current tension may be a third tension or a during driving tension. The information about the second current tension may be obtained continuously during driving, it may be obtained at regular or irregular time intervals, it may be obtained upon request from the processing circuitry 502, it may be pushed from the tension sensor 301 to the processing circuitry 501. The information about the second current tension may be obtained multiple times or it may be obtained once.

Step 408: This step corresponds to step 6 described earlier. The processing circuitry 502 may compare the planned tension and the second current tension. The planned tension may be the same as the second current tension or they may be different.

Step 409: This step corresponds to step 6 described earlier. The processing circuitry 502 may, during driving and before unloading the cargo, determine to initiate a second action when the second current tension is different than the planned tension, or that the difference is above the tension difference threshold. The second action may comprise to stop the vehicle 100. The action to be taken may be to change the tension of the strap, to repack the cargo etc. If the tension of the strap has changed, the cargo has probably already shifted during the driving, e.g. changed position in the vehicle 100. In addition to changing the tension again, some repacking of the cargo may also be needed. The decision to initiate the second action may comprise to send information about the action to e.g. a UE arranged to be used by the driver of the vehicle 100, to send instructions to the vehicle 100 etc.

Step 409: This step corresponds to steps 5, 7 and 8 described earlier. The processing circuitry 502 may utilize information from the comparison between the planned tension and the first current tension to improve future determining of the planned tension. The future determining of the planned tension may be improved by for example using AI and/or ML after a certain amount of cargo holds have been packed.

Step 410: This step corresponds to steps 5, 7 and 8 described earlier. The processing circuitry 502 may utilize information from the comparison between the planned tension and the second current tension to improve future determining of the planned tension.

The vehicle 100 comprises the computer system 500 described herein.

The computer system 500 is arranged for handling tension of at least one strap arranged for strapping cargo in a vehicle 100. The computer system 500 comprises processing circuitry 502 configured to obtain cargo information about the cargo to be loaded in the vehicle 100, and to obtain vehicle information indicating a loading capability of the vehicle 100. The processing circuitry 502 is configured to determine, based on the cargo information and the vehicle information, a pack plan for how to pack the cargo in the vehicle 100. The pack plan comprises a planned tension of the at least one strap when strapping the cargo in the vehicle 100. The processing circuitry 502 is configured to determine to start loading the cargo in the vehicle 100 and using the planned tension and to obtain information about a first current tension of the at least one strap when the loading is finished and before the vehicle 100 drives. The processing circuitry 502 is configured to compare the planned tension and the first current tension. and to determine to initiate a first action when a result of the comparison indicates that the first current tension is different than the planned tension.

The first action may comprise one or more of:

to change the first current tension of the at least one strap such that it is substantially the same as the planned tension; and/or to repack the cargo.

The pack plan may comprise information about one or more of the following:

a position of the cargo in the vehicle 100, wherein the position is based on one or more of: a cargo weight and/or an unloading order of the cargo and/or a fill ratio of the vehicle 100; and/or a number of available straps; and/or strap capability.

The processing circuitry 502 may be further configured to obtain information about a second current tension of the at least one strap during driving and before unloading the cargo from the vehicle 100. The processing circuitry 502 may be further configured to compare the planned tension and the second current tension. The processing circuitry 502 may be further configured to, during driving and before unloading the cargo, determine to initiate a second action when the second current tension is different than the planned tension. The second action may comprise to stop the vehicle 100.

The processing circuitry 502 may be further configured to utilize information from the comparison between the planned tension and the first current tension to improve future determining of the planned tension. The information about the first current tension may be obtained from a tension sensor 301 comprised in or associated with the at least one strap.

The processing circuitry 502 may be further configured to utilize information from the comparison between the planned tension and the second current tension to improve future determining of the planned tension. The information about the second current tension may be obtained from a tension sensor 301 comprised in or associated with the at least one strap.

A computer program product comprising program code for performing, when executed by a processing circuitry 502, the method of described herein. A non-transitory computer-readable storage medium comprising instructions, which when executed by a processing circuitry 502, cause the processing circuitry 502 to perform the method described herein. The vehicle 100 may comprise the processing circuitry 502.

FIG. 5 is a schematic diagram of a computer system 500 for implementing examples disclosed herein. The computer system 500 is adapted to execute instructions from a computer-readable medium to perform these and/or any of the functions or processing described herein. The computer system 500 may be connected (e.g., networked) to other machines in a LAN, an intranet, an extranet, or the Internet. While only a single device is illustrated, the computer system 500 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 500 may comprise at least one computing device or electronic device capable of including firmware, hardware, and/or executing software instructions to implement the functionality described herein. The computer system 500 may include processing circuitry 502 (e.g., processing circuitry including one or more processor devices or control units), a memory 504, and a system bus 506. The computer system 500 may include at least one computing device having the processing circuitry 502. The system bus 506 provides an interface for system components including, but not limited to, the memory 504 and the processing circuitry 502. The processing circuitry 502 may include any number of hardware components for conducting data or signal processing or for executing computer code stored in memory 504. The processing circuitry 502 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 502 may further include computer executable code that controls operation of the programmable device.

The system bus 506 may be any of several types of bus structures that may further interconnect to a memory bus (with or without a memory controller), a peripheral bus, and/or a local bus using any of a variety of bus architectures. The memory 504 may be one or more devices for storing data and/or computer code for completing or facilitating methods described herein. The memory 504 may include database components, object code components, script components, or other types of information structure for supporting the various activities herein. Any distributed or local memory device may be utilized with the systems and methods of this description. The memory 504 may be communicably connected to the processing circuitry 502 (e.g., via a circuit or any other wired, wireless, or network connection) and may include computer code for executing one or more processes described herein. The memory 504 may include non-volatile memory 508 (e.g., read-only memory (ROM), erasable programmable read-only memory (EPROM), electrically erasable programmable read-only memory (EEPROM), etc.), and volatile memory 510 (e.g., random-access memory (RAM)), or any other medium which can be used to carry or store desired program code in the form of machine-executable instructions or data structures and which can be accessed by a computer or other machine with processing circuitry 502. A basic input/output system (BIOS) 512 may be stored in the non-volatile memory 508 and can include the basic routines that help to transfer information between elements within the computer system 500.

The computer system 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 514 and/or in the volatile memory 510, which may include an operating system 516 and/or one or more program modules 518. All or a portion of the examples disclosed herein may be implemented as a computer program 520 stored on a transitory or non-transitory computer-usable or computer-readable storage medium (e.g., single medium or multiple media), such as the storage device 514, which includes complex programming instructions (e.g., complex computer-readable program code) to cause the processing circuitry 502 to carry out actions described herein. Thus, the computer-readable program code of the computer program 520 can comprise software instructions for implementing the functionality of the examples described herein when executed by the processing circuitry 502. In some examples, the storage device 514 may be a computer program product (e.g., readable storage medium) storing the computer program 520 thereon, where at least a portion of a computer program 520 may be loadable (e.g., into a processor) for implementing the functionality of the examples described herein when executed by the processing circuitry 502. The processing circuitry 502 may serve as a controller or control system for the computer system 500 that is to implement the functionality described herein.

The computer system 500 may include an input device interface 522 configured to receive input and selections to be communicated to the computer system 500 when executing instructions, such as from a keyboard, mouse, touch-sensitive surface, etc. Such input devices may be connected to the processing circuitry 502 through the input device interface 522 coupled to the system bus 506 but can be connected through other interfaces, such as a parallel port, an Institute of Electrical and Electronic Engineers (IEEE) 1394 serial port, a Universal Serial Bus (USB) port, an IR interface, and the like. The computer system 500 may include an output device interface 524 configured to forward output, such as to a display, a video display unit (e.g., a liquid crystal display (LCD) or a cathode ray tube (CRT)). The computer system 500 may include a communications interface 526 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system 500 for handling tension of a least one strap arranged for strapping cargo in a vehicle 100, the computer system 500 comprises processing circuitry 502 configured to:

- obtain cargo information about the cargo to be loaded in the vehicle 100;
- obtain vehicle information indicating a loading capability of the vehicle 100;
- determine based on the cargo information and the vehicle information, a pack plan for how to pack the cargo in the vehicle 100, wherein the pack plan comprises a planned tension of the at least one strap when strapping the cargo in the vehicle 100;
- determine to start loading the cargo in the vehicle 100 and using the planned tension;
- obtain information about a first current tension of the at least one strap when the loading is finished and before the vehicle 100 drives;
- compare the planned tension and the first current tension; and to
- determine to initiate a first action when a result of the comparison indicates that the first current tension is different than the planned tension.

Example 2: The computer system 500 of example 1, wherein the processing circuitry 502 is further configured to:

- obtain information about a second current tension of the at least one strap during driving and before unloading the cargo from the vehicle 100;
- compare the planned tension and the second current tension; and to
- during driving and before unloading the cargo, determine to initiate a second action when the second current tension is different than the planned tension.

Example 3: The computer system 500 of any of examples 1-2, wherein the processing circuitry 502 is further configured to:

- utilize information from the comparison between the planned tension and the first current tension to improve future determining of the planned tension.

Example 4: The computer system 500 of any of examples 2-3, wherein the processing circuitry 502 is further configured to:

- utilize information from the comparison between the planned tension and the second current tension to improve future determining of the planned tension.

Example 5: The computer system 500 of any of examples 1-4, wherein the Information about the first current tension is obtained from a tension sensor 301 comprised in or associated with the at least one strap.

Example 6: The computer system 500 of any of examples 2-5, wherein the Information about the second current tension is obtained from a tension sensor 301 comprised in or associated with the at least one strap.

Example 7: The computer system 500 of any of examples 1-6, wherein the first action comprises one or more of:

- to change the first current tension of the at least one strap such that it is substantially the same as the planned tension; and/or
- to repack the cargo.

Example 8: The computer system 500 of any of examples 2-7, wherein the second Action comprises to stop the vehicle 100.

Example 9: The computer system 500 of any of examples 1-8, wherein the pack plan comprises information about one or more of the following:

- a position of the cargo in the vehicle 100, wherein the position is based on one or more of: a cargo weight and/or an unloading order of the cargo and/or a fill ratio of the vehicle 100; and/or
- a number of available straps; and/or
- strap capability.

Example 10: A vehicle 100 comprising the computer system 500 of any of examples 1-9.

Example 11: A computer-implemented method for handling tension of at least one strap arranged for strapping cargo in a vehicle 100, the method comprising:

- obtaining 400, by processing circuitry 502 of a computer system 500, cargo information about the cargo to be loaded in the vehicle 100;
- obtaining 401, by the processing circuitry 502, vehicle information indicating a loading capability of the vehicle 100;
- determining 402, by the processing circuitry 502, based on the cargo information and the vehicle information, a pack plan for how to pack the cargo in the vehicle 100, wherein the pack plan comprises a planned tension of at least one strap when strapping the cargo in the vehicle 100;
- determining 403, by the processing circuitry 502, to start loading the cargo in the vehicle 100 using the planned tension;
- obtaining, 404, by the processing circuitry 502, information about a first current tension of the at least one strap when the loading is finished and before the vehicle 100 drives;
- comparing 405, by the processing circuitry 502, the planned tension and the first current tension; and
- determining 406, by the processing circuitry 502, to initiate a first action when a result of the comparison indicates that the first current tension is different than the planned tension.

Example 12: The method of example 11, comprising:

- obtaining, 407, by the processing circuitry 502, information about a second current tension of the at least one strap during driving and before unloading the cargo from the vehicle 100;
- comparing 408, by the processing circuitry 502, the planned tension and the second current tension; and during driving and before unloading the cargo, determining 409, by the processing circuitry 502, to initiate a second action when the second current tension is different than the planned tension.

Example 13: The method of any of examples 11-12, comprising:

utilize 410, by the processing circuitry 502, information from the comparison between the planned tension and the first current tension to improve future determining of the planned tension.

Example 14: The method of any of examples 12-13, comprising:

utilize 410, by the processing circuitry 502, information from the comparison between the planned tension and the second current tension to improve future determining of the planned tension.

Example 15: The method of any of examples 11-14, wherein the information about the first current tension is obtained from a tension sensor 301 comprised in or associated with the at least one strap.

Example 16: The method of any of examples 12-14, wherein the information about the second current tension is obtained from a tension sensor 301 comprised in or associated with the at least one strap.

Example 17: The method of any of examples 11-16, wherein the first action comprises one or more of:

to change the first current tension of the at least one strap such that it is substantially the same as the planned tension; and/or to repack the cargo.

Example 18: The method of any of examples 12-17, wherein the second action comprises to stop the vehicle 100.

Example 19: A computer program product comprising program code for performing, when executed by a processing circuitry 502, the method of any of examples 11-18.

Example 20: A non-transitory computer-readable storage medium comprising instructions, which when executed by a processing circuitry 502, cause the processing circuitry 502 to perform the method of any of examples 11-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system for handling tension of at least one strap arranged for strapping cargo in a vehicle, the computer system comprises processing circuitry configured to:

obtain cargo information about the cargo to be loaded in the vehicle;

obtain vehicle information indicating a loading capability of the vehicle;

determine, based on the cargo information and the vehicle information, a pack plan for how to pack the cargo in the vehicle, wherein the pack plan comprises a planned tension of the at least one strap when strapping the cargo in the vehicle;

determine to start loading the cargo in the vehicle using the planned tension;

obtain, from a tension sensor comprised in or associated with the at least one strap, information about a first current tension of the at least one strap when the loading is finished and before the vehicle drives;

compare the planned tension and the first current tension;

determine to initiate a first action when a result of the comparison indicates that the first current tension is different than the planned tension, utilize information from the comparison between the planned tension and the first current tension to improve future determining of the planned tension; and to utilize information from the comparison between the planned tension and a second current tension to improve future determining of the planned tension;

wherein the future determining of the planned tension is improved by using Artificial Intelligence and/or Machine Learning after a certain amount of cargo holds have been loaded in the vehicle.

2. The computer system of claim 1, wherein the processing circuitry is further configured to:

obtain information about a second current tension of the at least one strap during driving and before unloading the cargo from the vehicle;

compare the planned tension and the second current tension; and during driving and before unloading the cargo, determine to initiate a second action when the second current tension is different than the planned tension.

3. The computer system of claim 2, wherein the information about the second current tension is obtained from a tension sensor comprised in or associated with the at least one strap.

4. The computer system of claim 2, wherein the second action comprises to stop the vehicle.

5. The computer system of claim 1, wherein the first action comprises one or more of:

to change the first current tension of the at least one strap such that it is substantially the same as the planned tension; and/or to repack the cargo.

6. The computer system of claim 1, wherein the pack plan comprises information about one or more of the following:

a position of the cargo in the vehicle, wherein the position is based on one or more of: a cargo weight and/or an unloading order of the cargo and/or a fill ratio of the vehicle; and/or a number of available straps; and/or capability of the at least one strap.

7. A vehicle comprising a computer system of claim 1.

8. A computer-implemented method for handling tension of at least one strap arranged for strapping cargo in a vehicle, the method comprising:

obtaining, by processing circuitry of a computer system, cargo information about the cargo to be loaded in the vehicle;

obtaining, by the processing circuitry, vehicle information indicating a loading capability of the vehicle;

determining, by the processing circuitry, based on the cargo information and the vehicle information, a pack plan for how to pack the cargo in the vehicle, wherein the pack plan comprises a planned tension of the at least one strap when strapping the cargo in the vehicle;

determining, by the processing circuitry, to start loading the cargo in the vehicle using the planned tension;

obtaining, by the processing circuitry, from a tension sensor comprised in or associated with the at least one strap, information about a first current tension of the at least one strap when the loading is finished and before the vehicle drives;

comparing, by the processing circuitry, the planned tension and the first current tension; and determining, by the processing circuitry, to initiate a first action when a result of the comparison indicates that the first current tension is different than the planned tension, utilizing, by the processing circuitry, information from the comparison between the planned tension and the first current tension to improve future determining of the planned tension; and to utilizing, by the processing circuitry, information from the comparison between the planned tension and a second current tension to improve future determining of the planned tension;

wherein the future determining of the planned tension is improved by using Artificial Intelligence and/or Machine Learning after a certain amount of cargo holds have been loaded in the vehicle.

9. The method of claim 8, further comprising:

obtaining, by the processing circuitry, information about a second current tension of the at least one strap during driving and before unloading the cargo from the vehicle;

comparing, by the processing circuitry, the planned tension and the second current tension; and during driving and before unloading the cargo, determining, by the processing circuitry, to initiate a second action when the second current tension is different than the planned tension.

10. The method of claim 9, wherein the information about the second current tension is obtained from a tension sensor comprised in or associated with the at least one strap.

11. The method of claim 9, wherein the second action comprises to stop the vehicle.

12. The method of claim 8, wherein the first action comprises one or more of:

to change the first current tension of the at least one strap such that it is substantially the same as the planned tension; and/or to repack the cargo.

13. A computer program product comprising program code for performing, when executed by a processing circuitry, the method of claim 8.

14. A non-transitory computer-readable storage medium comprising instructions, which when executed by a processing circuitry, cause the processing circuitry to perform the method of claim 8.

* * * * *